United States Patent [19]

Nöhren

[11] Patent Number: 4,813,111
[45] Date of Patent: Mar. 21, 1989

[54] CENTRAL BELT LOCK FOR SAFETY BELTS

[75] Inventor: Hubert Nöhren, Hamburg, Fed. Rep. of Germany

[73] Assignee: Autoflug GmbH, Rellingen, Fed. Rep. of Germany

[21] Appl. No.: 733,225

[22] Filed: May 10, 1985

[30] Foreign Application Priority Data

May 12, 1984 [DE] Fed. Rep. of Germany ....... 3417752
Feb. 23, 1985 [DE] Fed. Rep. of Germany ....... 3506391

[51] Int. Cl.$^4$ ............................................. A44B 11/25
[52] U.S. Cl. .......................................... 24/632; 24/574
[58] Field of Search ................................ 24/629–633, 24/643–646, 652–655, 574, 602; 297/468; 280/801

[56] References Cited

U.S. PATENT DOCUMENTS

| | | | |
|---|---|---|---|
| 2,899,732 | 8/1959 | Cushman | 24/632 |
| 2,949,330 | 8/1960 | Musser | 24/643 X |
| 2,989,274 | 6/1961 | Moran | 24/632 X |
| 3,617,019 | 11/1971 | Femia | 24/631 X |
| 3,747,167 | 7/1973 | Pravaz | 24/574 |
| 4,403,376 | 9/1983 | Palloks | 24/631 |
| 4,589,172 | 5/1986 | Hoenigs et al. | 24/602 |

FOREIGN PATENT DOCUMENTS

| | | |
|---|---|---|
| A22898 | 10/1956 | Fed. Rep. of Germany . |
| 1002632 | 2/1957 | Fed. Rep. of Germany . |
| 1275875 | 8/1968 | Fed. Rep. of Germany . |
| WO82/01529 | 5/1982 | PCT Int'l Appl. . |
| 908401 | 10/1962 | United Kingdom ............ 24/632 |

*Primary Examiner*—Kenneth J. Dorner
*Attorney, Agent, or Firm*—Becker & Becker, Inc.

[57] ABSTRACT

A central belt lock for safety belts, especially such belts for pilots and other aviators or for parachute jumpers, for the rapid and at the same time releasable connection of several belts which come together at a central point. To avoid the problem of having to carry out, during fastening or release of the belt, operations which impair the reliability of the lock, the rotary lock member is provided with a linearly displaceable device which is operated by finger pressure. This device is provided with at least one transfer element for temporarily releasing an arresting mechanism for the connection members. The linearly displaceable device is spring loaded counter to the direction which it is pressed, and when it returns to its starting position it moves the arresting mechanism back into the arresting position.

19 Claims, 6 Drawing Sheets

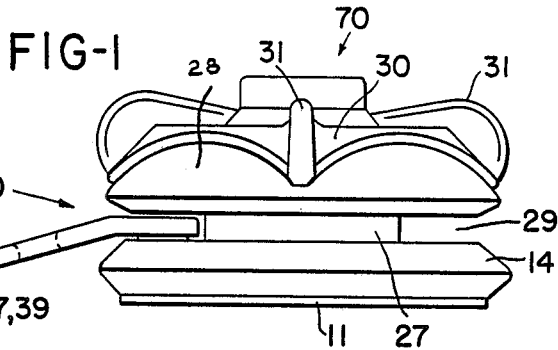
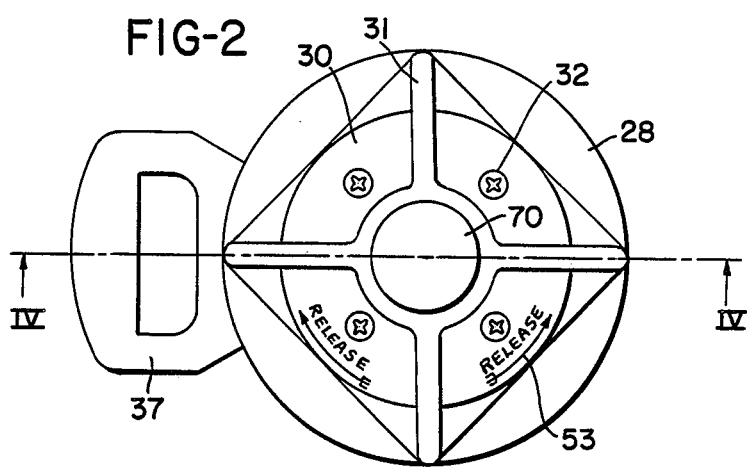
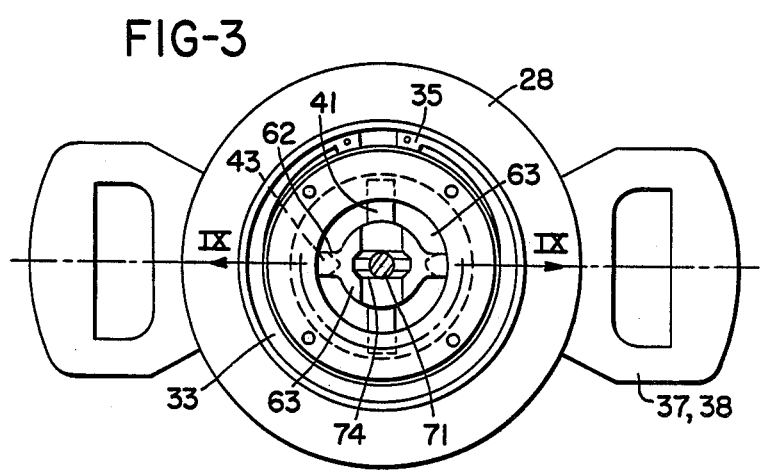

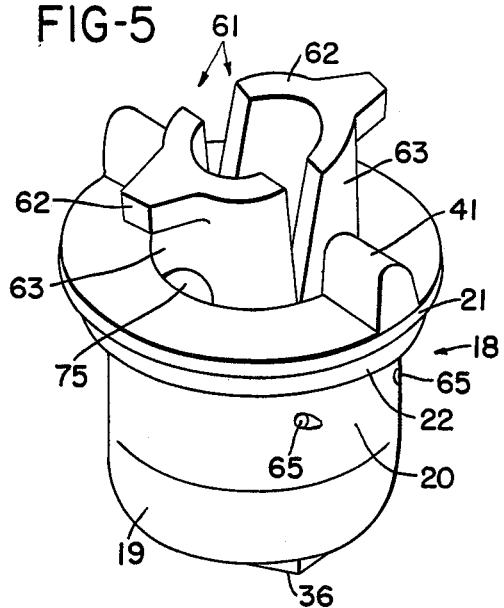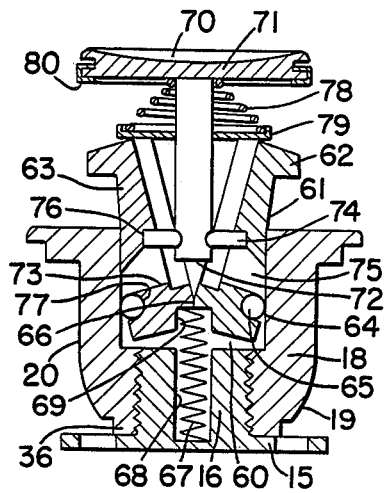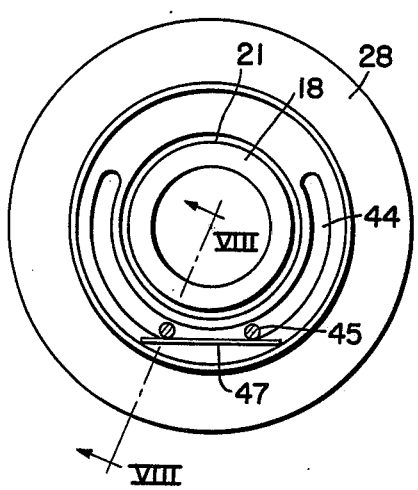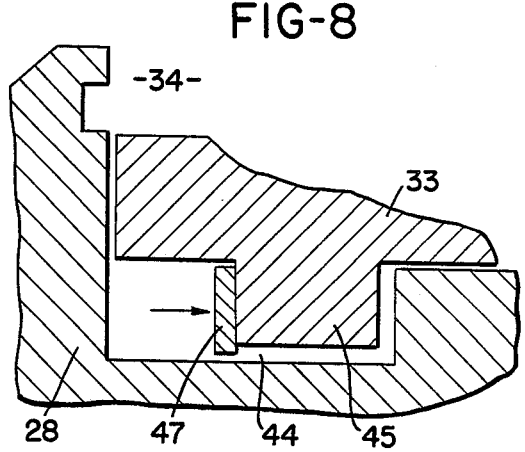

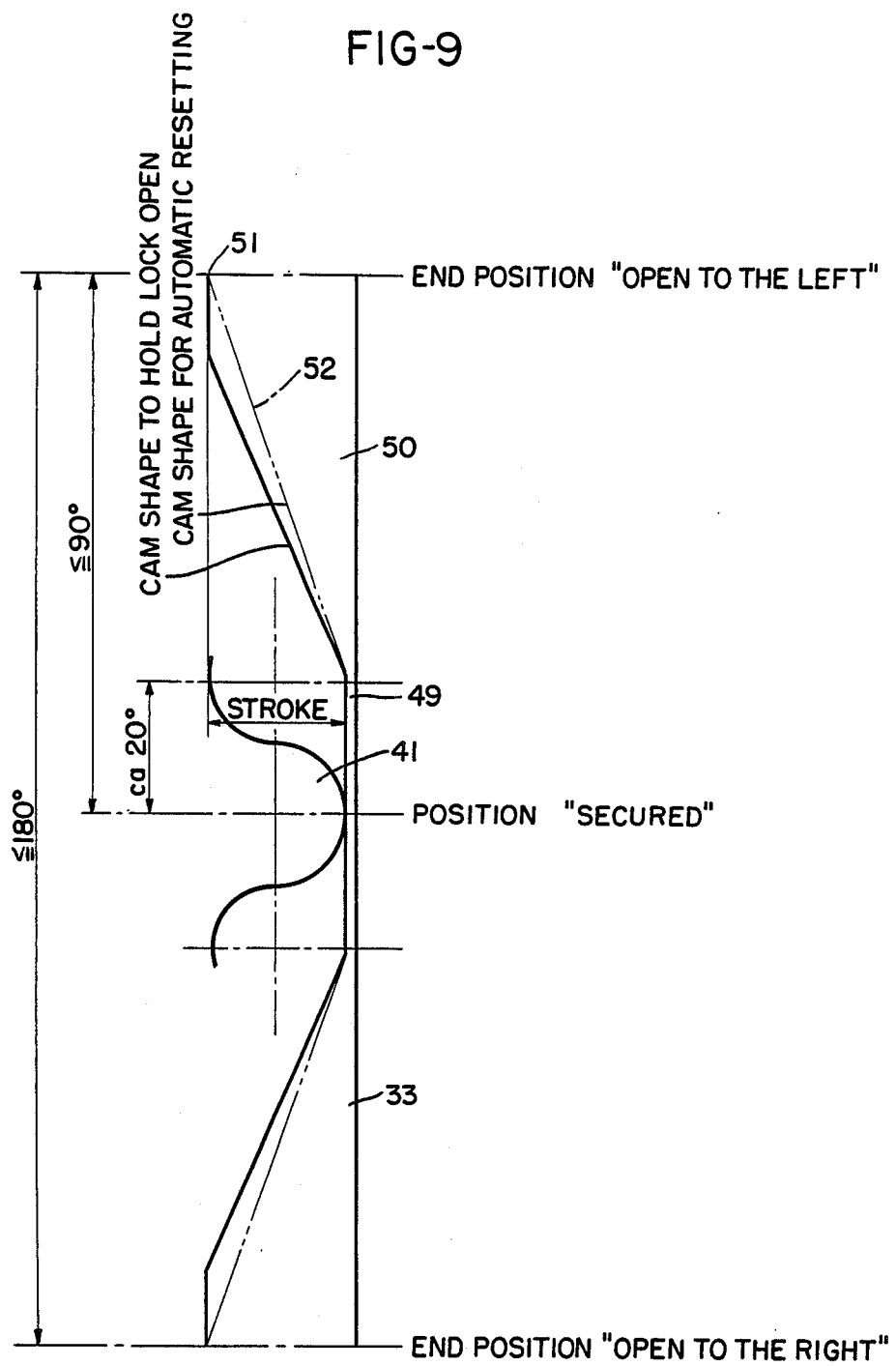

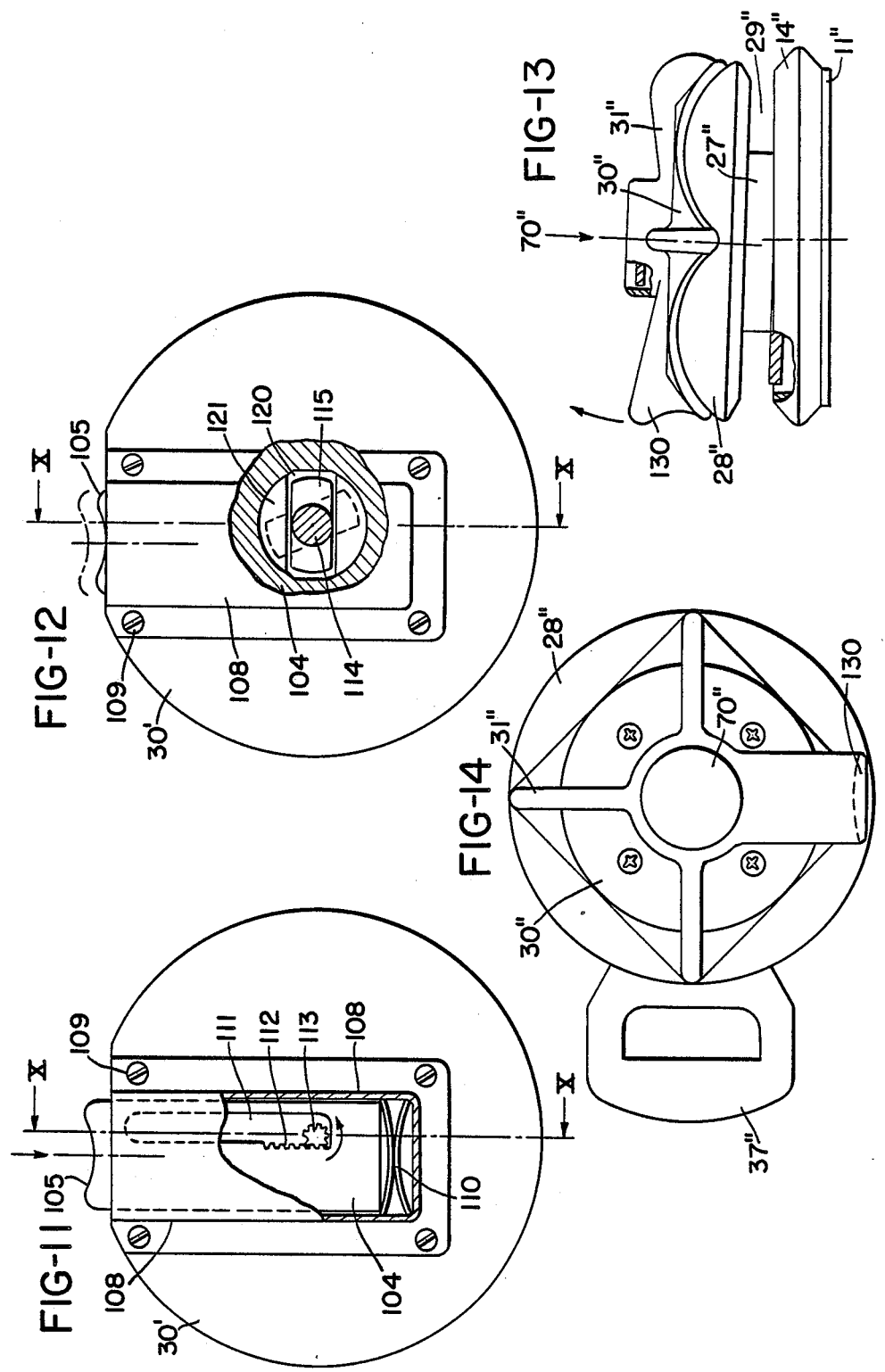

CENTRAL BELT LOCK FOR SAFETY BELTS

BACKGROUND OF THE INVENTION

1. Field of the Invention

The present invention relates to a central belt lock or buckle for safety belts, especially such belts for pilots and other aviators or for parachute jumpers, for the rapid and at the same releasable connection of several belts which are provided with connection members and which come together at a central point; the lock includes means for securely holding the connection members in place as well as for releasing the latter, with these means being operatively coupled with a manually operable and rotationally operable device, preferably a rotary disk or other rotary member, which is disposed over a central stud in conjunction with which the various movements in the lock occur.

2. Description of the Prior Art

Central belt locks having these general features are known in two types of embodiments, namely on the one hand from U.S. Pat. No. 4,403,376, Palloks issued Sept. 13, 1983, and belonging to the assignee of the present application, and on the other hand from German patent application No. A 22 898 XI/62c and German Auslegeschrift No. 10 02 632, published Oct. 4, 1956. To fulfill their purpose, and in connection therewith for proper handling, all of these heretofore known locks have three positions of their operating devices, namely the positions "fasten", "secured", and "release". All three of these positions can be achieved by operating one and the same manual actuation device; in other words, for "fastening", the person must operate the same device which also serves for setting the positions "secured" and "release". Therefore, errors during operation of such central belt locks cannot be completely precluded; for example, hasty manipulation during urgent use can cause a life-endangering error if after fastening the user forgets to place the lock in the position "secured". The present invention is therefore concerned with the problem of, after the fastening process, reliably assuring that the necessary position "secured" is achieved in central belt locks for safety belts, especially in such belts for pilots and other aviators or for parachute jumpers.

The most common type of actuation of the central belt locks is the manipulation of the operations by rotation of a rotary member and by pressing the disk toward the body of the person. Locks of this type are disclosed by the aforementioned German patent application No. A 22 898 XI/62c and German Auslegeschrift No. 10 02 632. These concern central belt locks having four spring-loaded anchor bolts and securing disks which are held by a guide cross. The locks have a main stud, which is displaceable at right angles to the base plate of the lock housing and acts upon the guide cross as well as the securing disk Mounted to the top of the main stud is a circular rotary member which can not only be rotated in both directions, but can also be pressed into the housing along with the main stud. In this way, the various lock operations can be manipulated.

However, the aforementioned central belt locks are provided only for a certain number of belts having appropriate connection members, and these members can catch at only certain locations on the lock. In contrast, the so-called bell locks pursuant to the previously mentioned U.S. Pat. No. 4,403,376 and German Auslegeschrift No. 12 75 875 have the advantage that they can receive more connection members and that the latter can automatically be adjusted in the precise pulling direction. Pursuant to a parallel proposal, the central belt locks of the bell type, i.e. with a circumferential edge bead for catching hook-shaped connection members at any desired location, and with a housing portion which is wobblingly mounted for this purpose, are also provided with a rotary actuation; in other words, these locks also have a rotary disk or other rotary member as a hand grip.

An object of the present invention is to provide a central belt lock of the aforementioned general type, in other words, one with a rotary member, according to which it is not necessary to effect a rotary operation in order to fasten the belts, i.e. in order to insert or hook the connection members into the lock housing so that as a result the rotary member only has to have two positions, namely "secured" and "release". During fastening of the belts these positions should not even come into consideration; instead, for the fastening, a manipulation should be provided which is independent thereof, and which at the same time performs satisfactorily, is structurally simple, and is reliable.

BRIEF DESCRIPTION OF THE DRAWINGS

This object, and other objects and advantages of the present invention, will appear more clearly from the following specification in conjunction with several embodiments which are partially schematically illustrated in the drawings, in which:

FIG. 1 is a side view of a central belt lock embodied as a so-called bell lock;

FIG. 2 is a plan view of the rotary member of the lock of FIG. 1;

FIG. 3 is a plan view of the lock of FIG. 1 with the rotary member removed and the pressure pin in section;

FIG. 5 is a perspective view of the main stud;

FIG. 6 is a longitudinal central sectional view through the main stud and push button in conformity with a portion of the view of FIG. 4;

FIG. 7 is a plan view of the tiltable holding disk with the cam member and rotary member removed;

FIG. 8 is an enlarged sectional view taken along the line VIII—VIII in FIG. 7;

FIG. 9 is a diagrammatic illustration, along with operational details, of the cam of the member projected into a plane, and is taken along the line IX—IX in 3;

FIG. 11 is a plan view of the lock of FIG. 10 with the slide button being partially exposed;

FIG. 12 is a plan view of the lock of FIG. 10 with the guide cross for the anchor bolts and securing member being partially exposed;

FIG. 13 is a partially sectioned side view of another inventive embodiment of a so-called bell-lock; and FIG. 14 is a plan view of the lock of FIG. 13, showing an inserted connection member.

SUMMARY OF THE INVENTION

Figure 4:
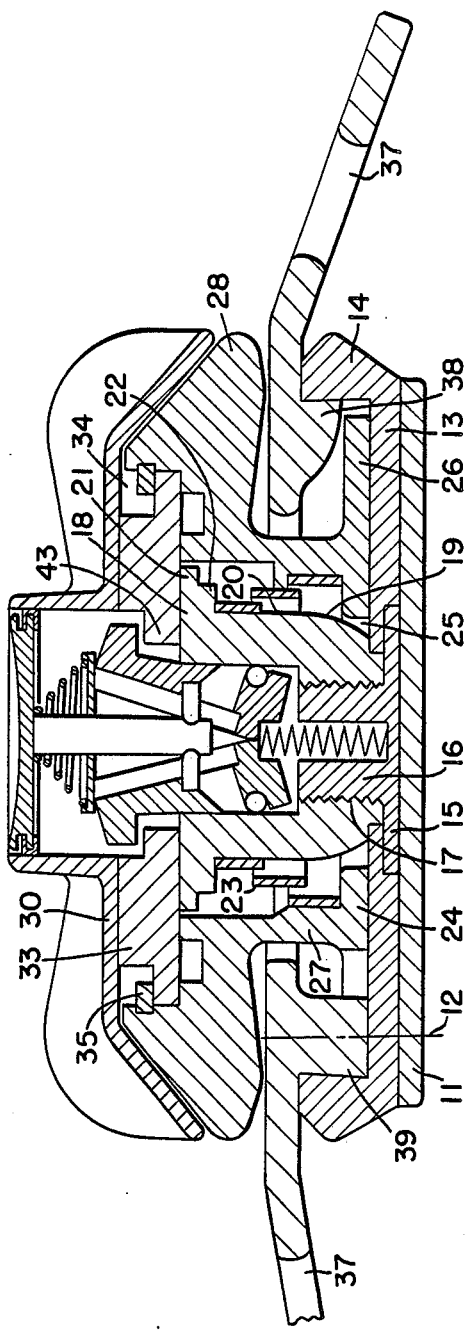
FIG. 4 is a diametrical cross-sectional view through the lock taken along the line IV—IV in FIG. 2, and also shows a further connection member.

The central belt lock of the present invention is characterized primarily in that the rotationally operable device is provided with a linearly displaceable device, preferably a push button or slide button, which is operated by finger pressure; an arresting means for preventing accidental release of the means for securely holding the connection members in place can be temporarily released by means of at least one transfer element; the linearly displaceable device is spring loaded counter to the direction in which it is pressed, and when it returns to its starting position it moves the arresting means back into their arresting position.

Specific advantageous embodiments will be presented subsequently.

An advantage achieved with the present invention is that the person, for example a pilot or parachute jumper, wearing the belt harness practically does not have to touch the actuating device, which is provided for disengaging and releasing the belts from the lock, at all when the harness is being fastened, so that no errors can accidentally occur as a result of the fastening process. To fasten the belt harness, i.e. to insert the connection members into the lock so that they are held firmly in place therein, a separate actuating device is provided which not only simplifies the fastening and thus makes it easier, but also gives the person wearing the harness the reassurance the reliability of the lock is not being impaired. As a result of the present invention, the user no longer has to control the maintenance of a certain position of the lock by looking at it. Rather, finger pressure suffices to enable a belt to be fastened without thereby in any way causing impairment of the reliability. To this extent, the present invention is particularly satisfactory in performance.

Although push buttons and slide buttons which are to be activated by a finger are known for belt locks, especially for safety belts in motor vehicles, and also, for example, for sea water-activated central belt locks for the belt harnesses of parachute jumpers, such finger buttons have a completely different purpose than does the present invention, and are generally provided for separating the belts from the lock; in other words, they are provided for releasing the belt harness. In contrast, the inventive buttons are provided for fastening the belts, rather than for releasing them.

A further drawback of the heretofore known locks is that it is not possible to have a separate intentional release of individual belt connection members, preferably the shoulder belt connection members, because when the lock function "release" is set with the known locks, all of the belt connection members are released from the lock, or it is necessary to execute a two-hand operation, namely the release of the arresting means and the withdrawal of the respective belt connection members.

It is therefore a further object of the present invention to improve the already inventively embodied locks in such a way that it is efficiently possible with one hand to intentionally release individual belt connection members, preferably the two shoulder belt straps, without eliminating the lock connection with the other belt straps.

This objective can only be applied to central belt locks of the bell type, and is realized by providing a grip recess on the rotary member over the connection members provided for the individual release After the push button which eliminates the arresting action of the lock is pressed, the grip recess permits a directed tilting of the holding disk, resulting in release of the pertaining belt connection members. Thus, the present invention has the particular advantage of being able to operate the lock with one hand.

DESCRIPTION OF PREFERRED EMBODIMENTS

Referring now to the drawings in detail, the belllock 10 illustrated in FIGS. 1-9 will be described first A cup-like housing 13, which is open in the middle, is secured by screws 12 to a circular disk-shaped base plate 11. The housing 13 has an external bead 14 which is hook-shaped in cross section, with the housing 13 being open upwardly. The housing 13 is also called a bell, for which reason this type of lock is known as a bell lock in technical circles.

A threaded bolt 16 is mounted in the central opening of the housing 13 via an end plate 15. By means of a threaded bore 17, the main pin or stud 18 of the central belt lock is screwed onto the bolt 16. As shown more clearly in FIG. 5, the lower portion of the stud 18 is spherically tapered; this taper 19 merges smoothly toward the top into the cylindrical part 20 of the stud 18. At the top, this cylindrical part is provided with an annular projection 21, below which is provided an annular step 22 on which is supported one end of a truncated cone spring 23. The other end of the truncated cone spring 23 is supported on the inner surface of a radial flange 24 which projects towards the middle of the housing 13. The radial flange 24 encircles an opening 25 which surrounds the main stud 18. The diameter of the opening 25 corresponds essentially to the diameter of the cylindrical part 20 of the stud.

The main stud 18, which is securely screwed to the housing 13, and is thus fixed thereto, is diagrammatically shown in perspective in FIG. 5, and in section in FIG. 6; details thereof will be described subsequently.

The radial flange 24, which supports the truncated cone spring 23 at the bottom, extends toward the bead 14 almost to the inner edge thereof, and forms an outer flange part 26 which together with the inner flange part 24 forms the bottom end of a hub 27, which surrounds the main stud 18. This hub 27 is concentrically seated in the form of a tubular extension on the underside of a ring-like holding disk 28, which is movable in a number of directions The holding disk extends to beyond the hook-shaped bead 14, and hence covers, from above, the annular hollow space formed between the bead 14 and the hub 27. The holding disk 28, the hub 27, and the radial flange 24, 26 are made in one piece, so that this component can, as a whole, be resiliently supported by the spring 23 from below against the step 22 of the main stud 18. This resilience can be perceived in that the holding disk 28 can be moved not only in the longitudinal direction of the main stud 18 counter to the pressure of the spring, but, in conformity to the typical function of bell locks, can also pivot or wobble on the main stud.

The operation of the tiltable or pivotable holding disk 28 must, as prescribed, be able to bring about at least three positions, namely the position "secured", in which the central belt lock is locked and crash resistant, the position "fasten" or "engage", and the position "opened" or "released" or "unfastened". In this regard, the illustrated connection members 37 of the not-illustrated belt straps of the harness play an important role; two possible types of construction of connection members 37 are shown in FIG. 4. The connection member 37 shown on the right has an end 38 which has a hook-shaped cross-section, the shape of which corresponds essentially to the hook-shaped bead 14 of the housing 13; the end 38 cooperates with this bead when the connection member is connected with the lock The end 38, due to the fact that its front is nearly tapered to a point, permits the connection member to be inserted into the slot between the housing 13 and the holding disk 28, with this slot forming an annular opening 29; as a result of this insertion, the two parts are pressed slightly apart This is possible because the holding disk 28, by virtue of its support, can tilt and can temporarily assume an inclined or tilted position in its non-secured state. The second type of construction of the connection member is shown at the left in FIG. 4, and has an end 39 which has an essentially rectangular cross-section. Although the end 39 can also be held in place by the bead 14 of the housing 13, it is not possible to insert this end into the annular opening 29 in the same way as was possible for the end 38. Therefore, a connection member 37 would have an end 39 when it is desired to retain connection of the connection element with the lock housing 13 even when the central belt lock 10 is opened, so that not every connection of the lock to the harness is broken, and a lock cannot be lost.

The positions "secured" and "opened" or "released" of the lock, i e. of the holding disk 28, are achieved by means of a device for rotary operation, which device will subsequently be abbreviated the rotary member 30. As shown in FIG. 2, what is involved in this case is not a circular member, but rather one having a square form, the surface of which conforms to the top surface of the holding disk 28 (FIG. 1), and which is provided with a ribbed cross 31 for a better positive grip. By means of four screws 32, the rotary member 30 is mounted on the top of an annular cam member 33, which is supported in an upper annular recess 34 of the holding disk 28. To keep the cam member 33 from springing out under the effect of the pressure of the spring 23, there is provided a spring or snap ring 35, which presses into a groove in the wall of the recess 34 of the holding disk 28, and at the same time rests, from above, on the step of the cam member 33 The radial dimension of the cam member 33 is such that it extends inwardly beyond the projection 21 of the main stud 18, thereby resting upon the upper surface of the stud when the holding disk 28 is in its rest position.

As shown in FIGS. 5 and 6, the main stud 18 is provided at the bottom with a square end or key 36 as a protection against turning; the square end 36 is seated in a corresponding recess in the floor of the housing 13, with the threaded bolt 16 passing through this square end 36. The interior of the cylindrical part 20 of the main stud 18 is hollow, and in particular in the form of an axial bore 60 which is open at the top. A component 61, which is movable in the manner of a gripper, is disposed in the axial bore 60 (FIG. 6). Towards the top, this component 61 projects beyond the main stud 18 like an attachment, and forms a locking member having two wings 62 which cooperate with two locking cams 43 disposed opposite one another below the wings 62 on the inner annular surface of the cam member 33, so that the locking member wings 62 can become aligned with one another when, on the one hand, the rotary member 30 along with the cam member 33 attached thereto, and, on the other hand, the main stud 18 along with the gripper-like component 61 and the wings 62, assume a certain position relative to one another, as shown in FIG. 3. The cam member 33, and hence also the holding disk 28 which in this respect is connected with the cam member, cannot move upwardly relative to the main stud 18, i.e. cannot either tip or wobble, when the wings 62 and the cam 43 overlap one another, i.e. are in the aligned state. This results in the "secured" position of the central belt lock.

The component 61, which as mentioned previously is movable in the manner of grippers, is essentially composed of two gripper members 63, which are disposed in the axial bore 60 of the main stud 18 as a mirror image to one another Each gripper member 63 is a high quality casting and has approximately the shape of a semi-cylindrical shell, on the upper outer edge of which is formed the locking member wing 62, while on the lower outer edge there is provided a pivot bearing 64 in the form of an outwardly open transverse bore Extending through the pivot bearing 64 are pivot pins 65 which at appropriate locations extend transversly through the main stud 18 and intersect the axial bore 60 in such a way that the pivot bearing 64 can make rolling contact with these pivot pins 65. Since, as shown in FIG. 6, the gripper members 63 have a shape which when viewed parallel to the vertical plane of symmetry tapers in the upward direction, each individual gripper member 63 is pivotable from an outer position, in which its outer partial cylindrical surface rests against the inner surface of the bore 60, to an inner position, where the two gripper members 63 contact one another, so that the locking member wings 62 move inwardly as a result of this pivotal movement, and free the locking cams 43. Contributing to this mobility is the fact that the bottoms of the gripper members 63, in the region of their pivot bearings 64, have such a width that they contact one another in the middle of the axial bore 60 and can make rolling contact with one another during pivoting via rounded surfaces 66.

The gripper members 63 are spring loaded from below, so that they are urged to pivot into their spread position as shown in FIG. 6, and to have their outer surfaces rest against the interior of the axial bore 60 For this purpose, there is provided a helical compression spring 67 which is disposed in an axial bore 68 of the threaded bolt 16, and which projects upwardly into the movement region of the gripper members 63. The latter, in turn, have an appropriate inverted axial bore 69 for the upper end of the spring 67; in other words, each gripper member 63 is provided with one half of a lower axial bore 69 for the spring 67.

Disposed in the middle of the rotary member 30 is a push button 70, which is to be activated with a finger, and by means of which the gripper members 63, and hence the locking member wings 62, can be pivoted inwardly against the pressure of the spring 67. For this purpose, a transmitting element, in the form of a pressure pin 71 mounted to the underside of the push button 70, is disposed between the latter and the gripper-like component 61. The pressure pin 71 projects into the space between the gripper members 63, and is provided at its bottom end with an actuation surface 72 which in the spread position of the gripper members 63 exerts a force, when the push button 70 is pressed, onto the respective inner projections 73 of the gripper members 63, thus pivoting these projections 73 inwardly, with the partial cylindrical shells of the gripper members 63 being united to form a complete cylindrical shape, the interior of which essentially corresponds to the size of the pressure pin 71. Near its bottom end, the pressure pin 71 is provided with stop projections 74, preferably in the form of a cross-pin which extends through the pressure pin and sticks out of both sides thereof. Each stop projection 74 is associated with a gripper member 63, which in the region of the up and down movements of the projections 74 is provided with combination cutouts 75 into which extend the pertaining stop projection 74, and which can assume two operating positions. As shown in FIG. 6, each upper cutout part 76 has a shape such that the associated stop projection 74 rests therein when the gripper members 63 are spread apart, and a lower cutout part 77 assures that the stop projection 74, after the push button 70 has been pressed, has enough free space for movement that the gripper members 63 can pivot toward the middle. Not only the gripper members 63, but also the push button 70 with its pressure pin 71, are subjected to an associated spring loading in the direction of the starting position. In particular, the gripper members 63 are subjected to the force of the aforementioned helical compression spring 67, and the push button 70 with its pressure pin 71 are subjected to the force of a truncated cone helical compression spring 78, which is supported between the underside of the push button 70 and an annular plate 79 which surrounds the pressure pin 71 and rests upon the top of the gripper-like component 61.

Disposed on the annular surface of the main stud 18, which surface encircles the axial bore 60 provided for receiving the gripper members 63, are two radially aligned guide members in the form of elevations or cams 41 for controlling the movements of the tiltable holding disk 28 via the cam member 33. The upper sides of the guide members 41 are provided with arched sliding surfaces for contacting the curves or cams of the disk-shaped cam member 33 (FIG. 5). These guide members or cams can, to reduce the friction on the cam member 33, also be in the form of non-illustrated rollers mounted on the main stud 18.

The cam member 33 has two identical curves or cams, each of which is composed of several curve or cam sections, as can be seen in detail in FIG. 9. The purpose of two cams is that the required position of the lock can be achieved not only by turning the rotary member 30, 31 to the right, but also to the left, thus assuring the most convenient and hence most reliable movement sequence for both hands of the user when the lock is being opened. This can be seen, for example in FIG. 2, in that the rotary member 30 can be operated not only in a clockwise direction but also in a counterclockwise direction in conformity with the engraved arrows 53.

In FIG. 9, the guide member 41 illustrated there assumes the position "secured" relative to the cam member 33, while the position "released" is achieved by turning the rotary member 30 90° in either direction These two positions of the central belt lock are thus effected by operation of the rotary member 30, 31, which appropriately acts upon the cam member 33 which is rigidly connected thereto. The main stud 18 with its guide members 41 does not alter its position in the lock relative thereto, so that the cams of the cam member 33 can slide over these cams 41. At the same time, this means that the gripper-like component 61 also maintains its position, so that the push button 70 and the pressure pin 71 also do not rotate with the rotary member 30, 31. In this connection, the push button 70 can expediently be provided around its edge with a slide member 80 for reducing the friction between the push button 70 and the rotary member 30 (FIGS. 4 and 6).

The third required position of the lock must make it possible to "fasten" the belt; in other words, it must be possible to insert the connection members 37 into the annular opening 29 so that the ends 38 of the connection members 37 can snap in over the bead 14. To accomplish this, it is necessary to open the annular opening 29 at the appropriate location, for which purpose the holding disk 28 must be raised at that location, i.e. the holding disk 28 must be tilted relative to the housing 13 and hence must also extend at an angle relative to the longitudinal central axis of the main stud 18. This, in turn, is only possible when the locking cam 43 and the locking member wings 62 are no longer in alignment with one another, because otherwise the annular opening 29 could not possibly be opened This is where the functional objective of the push button 70 comes into play, as will be subsequently described in conjunction with the operation of the central belt lock as a whole When the central belt lock 10 is attached to the connection member 37, 39, it is located approximately in the middle of the front of the body of the user, where it can be conveniently reached with both hands. The belt lock, along with the rotary member 30, 31, assumes the position illustrated in FIG. 2; the interior of the lock corresponds to the state illustrated in FIGS. 3, 4, and 7. The position of the lock is "secured". In this position, the locking member wings 62 are disposed precisely above the two locking cams 43 on the inner periphery of the cam member 33. Thus, the cam member 33 and the holding disk 28 cannot move upwardly As a result, it is not possible to open the lock.

To fasten the harness, i e to insert the, for example, five connection members 37, 38 of the belt straps of the harness (not illustrated) in question, which belt straps extend radially relative to the central belt lock 10, into the annular opening 29 of the lock, the user presses one of his fingers against the push button 70, as a result of which the pressure pin 71 is moved downwardly against the force of the spring 78 and the actuation surface 72 of the pressure pin 71 contacts the inner projections 73 of the gripper members 63. At the same time, the stop projections 74 on the pressure pin 71 exit downwardly out of the upper parts 76 of the cutouts 75 in the gripper members 63, and enter the lower parts 77 of the cutouts 75 The gripper members 63 can now pivot freely inwardly until their four longitudinal edges abut one another In so doing, the locking member wings 62 also move inwardly out of the projection of the main stud 18 and of the locking cams 43, so that the holding disk 28 is now free to tilt. If the user now inserts a connection member 37, 38 into the annular opening 29, the connection member can catch behind the bead 14 without the rotary member 30, 31 having to be moved out of its position "secured". Associated herewith is a corresponding increase of the reliability of the holding function of the lock, since after the pertaining connection member catches, the holding disk 28 immediately snaps back under the pressure of the spring 23 and closes the annular opening 29; and when the user finally removes his finger from the push button 70, the locking member wings 62 are again disposed over the locking cams 43 This takes place under the pressure of the spring 67, which spreads the gripper members 63, while at the same time the upwardly moving pressure pin 71 effects entry of the stop projection 74 into the upper parts 76 of the cutouts 75, thus arresting the gripper members 63 in their spread position Only in this position, "secured", can the locking cams 43 assume a position below the wings 62.

FIGS. 7 and 8 show a further configuration of the cam member 33, with this configuration preventing the rotary member 30 from being turned too far, and furthermore assuring that the position "secured" is maintained For this purpose, the holding disk 28 is provided on the base of its upper recess 34 with a partially circular groove 44 into which project two stop pins 45, which are mounted to the bottom of the cam member 33. The groove 44 extends over a sector which includes both of the open positions of the rotary member 30. Disposed in the central portion of the groove 44 is a stop spring 47 which, in the manner of a return spring, controls the rotary member 30 in such a manner that the lock, with the aid of the truncated cone spring 23, always returns automatically to the position "secured".

In the "secured" position of the lock, the two cams of the cam member 33 extend relative to the cam-shaped guide members 41 on the upper annular surface of the main stud 18 in the manner illustrated in FIG. 9. The cam member 33 has a cam or a curve section 49 which extends parallel to the surface of the main stud 18 and which rests upon the associated guide member 41, so that the cam member 33, and hence also the holding disk 28, assume their most recessed position relative to the lock housing 13. Only in this position—position "secured"—can the locking cams 43 pass below the locking member wings 62 on the upper outer ends of the gripper members 63.

To rapidly and simultaneously release all of the connection members 37, 38, for example after a parachute jumper has landed, the user grasps the rotary member 30 with one of his hands and turns it in either direction until either the right or left position "release" is reached (FIG. 2). This rotation can be effected without any particular attention being paid thereto until the abutment of the stop pin 45 against the respective end of the groove 44 is felt, since the rotary member 30 cannot be rotated any further. In this connection, the relative pivotal movement between the locking member wings 62 and the cam member 33 and locking cams 43 amounts to a right angle; however, it should be borne in mind that the main stud 18 with the gripper-like component 61 remains stationary while the cam member 33 rotates During rotation, not only do the locking cams 43 move out of alignment with the locking member wings 62, but the two cams of the cam member 33 also slide along the guide members 41 past the position which permits fastening, whereupon the respective curve or cam sections 50 (FIG. 9) become operational; these cam sections extend at an incline, and form with the central longitudinal axis of the lock a medium acute angle which, in conjunction with the length of the sections 50, produces a stroke of the cam member 33 which, as shown in FIG. 9, corresponds to the dimensions of the cams or guide members 41. At the same time, this stroke is great enough that it suffices to allow the hookshaped parts of the connection members 37, 38 on the one hand, and of the bead 14 on the other hand, to slide away from one another Since the cam member 33 is fixedly connected with the holding disk 28, and the outer radial flange 26 of the hub 27 is disposed on the holding disk 28, this flange is raised and conveys those connection members 37, 38 which are in the lock housing 13 upwardly out of the annular opening 29. In contrast to the process during fastening, where the holding disk 28 tilts or wobbles, during release the holding disk 28 moves parallel to the axis of the main stud 18 upwardly away from the housing 13; this movement is controlled by the section 50 of the cam member 33, and by the construction of the main stud 18.

As shown in FIG. 9, the ends of the cams of the cam member 33 can have an alternative configuration in the region of the positions "release", which are at both ends; in particular, the sections 50 can either have connected thereto short sections 51 which extend parallel to the central section 49, or the cams can also form respective points at the two open positions, as is shown in FIG. 9 by the dot-dash lines 52. This means that the position "release" is either held in a stable position or, due to the unstable state pursuant to the cam section 52, is designed for automatic resetting of the lock; in other words, the respective cams or guide members 41, after the rotary member 30 has been released, slide on their own under the effect of the spring 23 back to the respective position "secured". It depends upon the particular application of the central belt lock in question as to which cam shape the cam member 33 should have.

Figure 10:
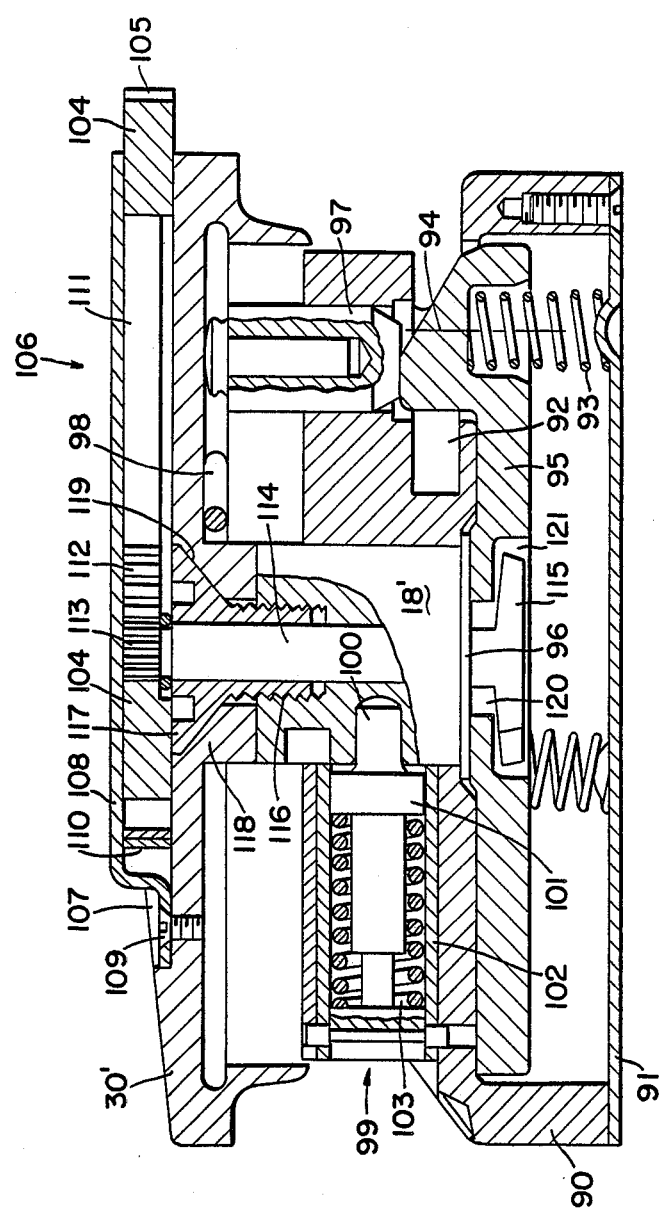
FIG. 10 is diametrical cross-sectional view through a second inventive embodiment of a central belt lock having anchor bolts, and is taken along the line X—X in FIGS. 11 and 12.

A second embodiment of the present invention is illustrated in FIGS. 10-12 Involved in this case is a central belt lock having the general features discussed in connection with the previously mentioned German patent application No. A 22 898 XI/62c, i.e. with anchor bolts and a guide cross to centrally connect, for example, four (not illustrated) belts by means of connection members The lock has a housing 90 with a base plate 91, a central main stud 18', and a rotationally operable device 30' in the form of a rotary disk or other rotary member Slot-like recesses 92 are provided in the lock housing 90 parallel to the base plate 91; the connection members of the belts which are to be connected are inserted into these slot-like recesses 92 Disposed in the central portion of the axial projection of the recesses 92 are axially displaceable anchor bolts 94 which are respectively loaded by a helical compression spring 93; as shown in FIG. 10, these anchor bolts 94 extend into the inner space of the recesses 92, and can hence hold the connection members securely in place The anchor bolts 94 are integrally interconnected by a guide cross 95, which through the interposition of a flange 96 rests from below against the main stud 18' Since the latter can be axially displaced in the housing 90 by manually pressing against the rotary member 30', it is possible in this manner to move the guide cross 95 and the anchor bolts 94 to the base plate 91, as a result of which the anchor bolts 94 are withdrawn downwardly out of the slot-like recesses 92, so that the connection members are released and can be readily removed from the lock.

So that the lock does not fall off from the harness and become lost during opening and removal of the connection members, one of the anchor bolts 94 is combined with a device which at this one location prevents the separation of the pertaining connection member from the lock, so that the lock or buckle remains suspended on the associated belt. The device comprises a auxiliary bolt 97 which is axially displaceably mounted above the pertaining anchor bolt 94 in an appropriate bore in the housing; the upper end of the auxiliary bolt 97 rests against the bottom of the rotary member 30'. When, during opening of the lock, the rotary member 30' along with the main stud 18' are pressed into the housing 90, this movement also extends to the auxiliary bolt 97 and presses the latter downwardly in the same manner into the pertaining slot-like recess 92 as the anchor bolt 94 located there leaves this recess; in other words, the auxiliary bolt 97 follows the anchor bolt 94 without interrupting the holding action on the associated connection member, so that the latter cannot leave the lock. Instead, the lock remains attached to the connection member. When, by appropriate adjustment of the rotary member 30′, the main stud 18′ in the housing 90 is again moved upwardly, which occurs under the pressure of the springs 93, the anchor bolt 94 illustrated in FIG. 10 also pushes the auxiliary bolt 97 upwardly and at that location enters the slot-like recess 92 and the connection member (not illustrated) located therein. To keep from losing the auxiliary bolt 97, the top of the latter is held in position by a spring clip 98.

Diametrically opposite the auxiliary bolt 97 there is disposed in the lock housing 90 a device 99 for fixing the positions of the main stud 18′. The fixing device 99 essentially comprises a fixing bolt 100 along with a guide piston 101 and guide cylinder 102, as well as a helical compression spring 103. The latter acts upon the guide piston 101, and hence the fixing bolt 100, in the direction toward the main stud 18′, which along a portion of its periphery is provided with a milled combination guide way (not shown) in which the fixing bolt 100 slidingly moves over various stop positions when the rotary member 30′, and hence the main stud 18′ move into the provided positions, As can be seen in particular in FIGS. 11 and 12, the rotary member 30′ is provided at the top with flat, elongated slide key or button 104, the finger recess 105 of which projects laterally beyond the rotary member 30′, so that it can be easily and reliably reached and operated. The slide button 104 is longitudinally displaceably guided in a pocket-like rail 106 of appropriate size, with the rail 106 being composed on the one hand of a groove 107 milled into the surface of the rotary member 30′, and on the other hand of a stamped sheet-metal cover 108. The cover 108 is attached to the rotary member 30′ by means of four screws 109, and is open at one narrow end to provide an opening for the slide button 104 and its finger recess 105. A double flat spring 110 is disposed in the deepest part of the rail 106, which is formed as a path of movement for the slide button 104 and is formed by the groove 107 and the sheet-metal cover 108. This spring 110 pressure-loads the slide button 104, so that the force of the spring 110 must be overcome when the finger recess 105 is pushed, with the force of the spring 110 also subjecting the slide button 104 to an appropriate resetting.

An elongated slot 111 is formed in the slide button 104 and is offset relative to the center thereof. Along its inner edge, the slot 111 is embodied as a toothed rack 112 which meshes with a pinion 113. This pinion 113 extends from below into the open space of the elongated slot 111, and is disposed on the upper end of a rotary pin 114 which is axially disposed in the main stud 18′, on a securing member 115, as a transfer element for the movements of the linearly displaceable device or slide button 104, which is operated by finger pressure; the securing member 115 acts upon the anchor bolt 94. The pinion 113, the rotary pin 114, and the securing member 115 thus form a unit, and are preferably manufactured as one piece. In particular, the mounting of the rotary pin 114 in the lock is as follows: The main stud 18′ is provided at the top with a threaded bore 116 into which is screwed a specially shaped countersunk screw 117, which is seated in the center of the rotary member 30′ where the latter is provided with a bottom hub 118 which rests upon the main stud 18′ and is aligned therewith The hub 118 has a central bore 119 which has a truncated cone shaped widened portion at its upper end in conformity to the shape of the screw 117. The counter-sunk screw 117 passes through the hub 118 and extends into the main stud 18′ via the threaded bore 116, with the surface of the screw head being flush with the base of the groove 107, so that the screw 117 does not obstruct the movements of the slide button 104. Not only the main stud 18′, but also the counter-sunk screw 117, are each provided with an axial bore for rotatably guiding the rotary pin 114, the longitudinal axis of which coincides with the central axis of the lock, so that the pinion 113 is disposed in the middle of the rotary member 30′. Furthermore, the screw 117 rigidly connects the rotary member 30′ with the main stud 18′.

The securing member 115 at the lower end of the rotary pin 114 is embodied as a T-shaped locking bar which passes through the middle of the guide cross 95. For this purpose, the latter is provided at this location with a slot 120, the length of which corresponds to the span of the T-shaped locking bar 115, so that when these two parts are aligned with one another, the guide cross 95 along with the anchor bolts 94 can be moved in the axial direction of the main stud 18′ past the securing member 115 (FIG. 12). As can be seen in particular from FIG. 10, the slot 120 is surrounded on the under side of the guide cross 95 with a circular depression 121, the diameter of which is great enough that the T-locking bar 115 can be transversely disposed therein. In such a transverse position, the guide cross 95 cannot move downwardly past the T-locking bar securing member 115. The adjustment of the rotary pin 114 with the pinion 113 and securing member 115 relative to the main stud 18′, the rotary member 30′, and the slide button 104 is undertaken during assembly of the lock in such a way that when the double flat spring 110 is relaxed, and hence the slide button 104 is not pressed in, the securing member 115 (T-locking bar) is disposed transversely relative to the slot 120, so that the guide cross 95 with the anchor bolts 94 is arrested from movements toward the base plate 91. In this position, the connection members can thus not escape the slot-like recesses 92, even when a shock-like load is encountered.

To use the central belt lock shown in FIGS. 10–12, three positions are required, namely "fasten", "secured", and "release". In the position "secured", the lock parts assume the position shown in FIG. ′ 10, i.e. the main stud 18′ is in its uppermost position, the fixing device 99 is engaged, and the securing member 115 is disposed transversely in the depression 121, so that the guide cross 95 and the anchor bolts 94 cannot move axially. To open the lock and release the belts, the user rotates the rotary member 30 with one hand about the longitudinal central axis into the position "release", whereby not only the main stud 18′ but also the rail 106′ with the slide button 104 turn along with the rotary member 30′. In so doing, the fixing bolt 100 slides in a nonillustrated groove in the main stud 18′ Since the slide button 104 remains at rest, the rotary pin 114 and the T-locking bar 115 also turn, and in particular, by means of the control of the fixing device 99, until the T-locking bar 115 and the slot 120 are aligned with one another (FIG. 12). The user can now press the rotary member 30′ axially toward the housing 90, thus displacing the main stud 18′ toward the base plate 91, while at the same time the flange 96 presses upon the guide cross 95 to take it downwardly along with it. Since the anchor bolts 94 and the guide cross 95 are integrally connected, they also move downwardly out of the slot-like recess 92, so that the connection members are free and can be removed from the recesses 92. The lock is now opened.

To fasten the harness, the lock is again placed into its position "secured" by turning back the rotary member 30',(FIG. 10). The anchor bolts 94, which immovably extend into the recesses 92, now would not permit an insertion of the connection members due to the transverse disposition of the securing member 115 if it were not possible simply by pressing a finger against the recess 105 of the slide button 104 to briefly release the securing member 115. When the slide button 104 is pressed in, the toothed rack 112 imparts to the pinion 113 a rotary movement which is transmitted from the rotary pin 114 to the securing member 115, with the T-locking bar 115 rotating in the depression 121 as shown in FIG. 12 by about 90° into a position where it is aligned with the slot 120; as a result, the arrested position of the guide cross 95 is temporarily eliminated. If the user now inserts one connection member into a recess 92, he can at that location move the anchor bolts 94, which are sloped to facilitate their movement, along with the guide cross 95, downwardly. In other words, the guide cross 95 is for a short period of time disposed at an angle relative to the base plate 91; as soon as the connection member, with its hole for the anchor bolt 94, has entered far enough into the recess 92, the anchor bolt 94 again snaps upwardly under the pressure of its spring 93, and the guide cross 95 again extends parallel to the base plate 91. This process is repeated in conformity with the number of connection possibilities for connection members of belts provided in the lock, and for this length of time the user must keep the slide button 104 pressed in with his finger, unless he prefers to operate the slide button 104 separately for each insertion of a connection member. Once insertion of connection members is completely finished, the user again releases the slide button 104, which under the pressure of the double flat spring 110 returns to its starting position. Due to the rotary pin 114 as a transfer element, this also applies for the securing member 115; in other words, the lock is securely arrested without the user having had to operate the rotary member 30' as such for the fastening. Therefore, only two positions have to be provided on the rotary member itself.

Pursuant to the further inventive embodiment illustrated in FIGS. 13 and 14, there is provided for a bell lock an efficient disconnection and release of the shoulder belt straps (not illustrated). For this purpose, a grip recess 130 is provided on the rotary member 30" of the lock above the shoulder belt straps provided for the separate release. This belt functions in essentially the same manner as described in connection with the first embodiment.

Operation of the push button 70" terminates the arresting of the lock, so that the holding disk 28 can be tilted. Whereas during the insertion of the belt connection members when the push button 70" is pressed in the tilting of the holding disk 28" is effected by the pressure of the appropriately shaped belt connection members, the appropriate tilting movement of the holding disk 28" during the efficient and planned release of the shoulder straps is achieved by raising the grip recess 130, which for this purpose is provided on the rotary member 30" above the belt connection members which are to be released.

As soon as the user has terminated the arresting of the lock by operating the push button 70", he can, by means of the grip recess 130 disposed above the shoulder straps provided for the release, tilt the rotary member 30", and hence the holding disk 28" which is rigidly connected thereto, preferably with the thumb, until the holding disk 28" and the bell edge form a plane, with the result that the connection members of the shoulder straps can slide out of the lock. As soon as equalization of the components is achieved, the connection members of the shoulder straps, which are generally under the light belt pull of a belt reeling-in device, can slide out of the lock, while the other belt connection members continue to be held securely in place in the lock by means of the holding disk 28".

The present invention is, of course, in no way restricted to the specific disclosure of the specification and drawings, but also encompasses any modifications within the scope of the appended claims.

What I claim is:

1. A central belt lock for safety belts, especially such belts for pilots and other aviators or for parachute jumpers, for the rapid and at the same time releasable connection of several belts which are provided with connection members and which come together at a central point; the lock includes means for securely holding said connection members in place as well as for releasing the connection members, with said means being operatively coupled with a manually operable rotary member, which is disposed over a central stud in conjunction with which various movements in the lock occur; the improvement therewith which comprises:

said rotary member having disposed adjacent thereto a linearly displaceable device which is operated by finger pressure to move out of a starting position thereof;

arresting means operatively associated with and having an arresting position to prevent the accidental release of said means for securely holding said connection members in place;

at least one transfer element operatively associated with said linearly displaceable device and said arresting means for temporarily releasing said arresting means;

spring means for spring-loading said linearly displaceable device counter to the direction in which said displaceable device is pressed when operated; said linearly displaceable device, when returning to the starting position thereof under the effect of said spring means, moving said arresting means back to the arresting position thereof respectively;

a lock housing having a hook-shaped bead, and also including, as said means for securely holding said connection members in place, a disk which is disposed across from said bead, is displaceable, by means of a hub disposed around said stud which is secured to said housing, at right angles to the base plate of said housing against action of said spring means, and is tiltable in at least that position of said rotary member which permits said connection members to be inserted into said lock; the lower end of said hub, remote from said tiltable disk, is provided with an at least partial radial flange which extends outwardly to a location below said connection members which are engaged; guide members are provided on said stud; an annular cam member is provided to which said rotary member is connected; said cam member has cam surfaces, and controls the movements of said tiltable disk by means of said guide members, which move on said cam surfaces when said rotary member is turned;

the upper end of said stud, remote form said base plate of said housing, has a part which, on that side of said guide members remote from said vase plate of said housing, is provided with a two-winged locking member for arresting said tiltable disk in a securing position; the further improvement therewith comprising:

a stud having an axial bore which is open remote from said base plate of said housing;

as said part of said stud, a component which is movable in the manner of a gripper, and is disposed in said axial bore of said stud; said component part includes gripper members which form said locking member wings, which in turn form said arresting means;

locking cams provided on the radially inner periphery of said cam member, with said locking member wings being disposed above and in alignment with said locking cams in the functional arresting position of said wings; and a linearly displaceable device disposed in the center of said rotary member, with said transfer element of said device contacting said gripper members to move said gripper members.

2. A central belt lock according to claim 1, in which said component includes two gripper members, which are pivotably disposed in said axial bore of said stud so that mirror images exist relative to one another; each of said gripper members having approximately the shape of a semi-cylindrical shell having an upper outer edge which is remote from said base plate of said housing, and on which is formed a respective one of said wings, which projects therefrom; each of said gripper member shells also has a lower outer edge on which is provided a pivot bearing about which that shell is pivotable from an outer location, in which an outer partial cylindrical surface of said gripper member shell rests against the inner surface of said axial bore of said stud, to an inner position, in which the two gripper member shells contact one another so that said locking member wings are shifted inwardly and release said locking cams of said cam member.

3. A central belt lock according to claim 2, which includes pivot pins which extend transversely through said axial bore of said stud, and in which said pivot bearings of said gripper member shells include partial cylindrical recesses in the latter which partially surround said pivot pins.

4. A central belt lock according to claim 2, in which said gripper members are spring-loaded from the base of said axial bore of said stud so that said gripper members are urged to pivot in a spread-apart position, which corresponds to said outer location in which said outer partial cylindrical surfaces of said gripper member shells rest against the inner surface of said axial bore.

5. A central belt lock according to claim 4, in which the base of said axial bore of said stud is provided with a further axial bore of lesser diameter; a second helical compression spring is disposed in said further axial bore and projects therefrom into said first axial bore and into the region of movement of said gripper members in order to effect said spring-loading of the latter.

6. A central belt lock according to claim 5, in which the base of said first axial bore of said stud is in the form of a threaded bolt, the center of which is disposed in said further axial bore for receiving said second spring; said stud is provided with an appropriate threaded bore for receiving said threaded bolt which, remote from said component part, is provided with a radial flange by means of which said stud is mounted to said lock housing.

7. A central belt lock according to claim 5, in which said gripper members have an axis of symmetry which extends at substantially right angles to said base plate of said housing; said gripper members narrow in the direction away from said base plate, with the width thereof in the vicinity of said pivot bearings being such that said gripper members contact one another in the middle of said first axial bore, where they are respectively provided with rounded surfaces which make rolling contact with one another during pivoting of said gripper members.

8. A central belt lock according to claim 7, in which each of said gripper members, on that side facing said second spring, is provided with one half of an axial bore, said halves together forming a third inverted axial bore for receiving part of said second helical compression spring.

9. A central belt lock according to claim 7, in which said first spring is a compression spring disposed between said gripper members and said linearly displaceable device; in which said narrowed gripper members have between them an inner space which is at least the size of said transfer element, which extends from said device into said inner space between said gripper members, each of which is provided with an inner projection; and in which that end of said transfer element remote from said linearly displaceable device is provided with an actuation surface which in the spread-apart position of said gripper members exerts a force, when said device is pressed in, against said inner projections of said gripper members to pivot the latter inwardly against the pressure of said second spring.

10. A central belt lock according to claim 9, in which said transfer element, near that end thereof remote from said linearly displaceable device, is provided with stop projections, and in which said gripper members are provided with cutouts disposed adjacent one another, in the vicinity of the back and forth movements of said stop projections, to on the one hand cooperate with said stop projections to arrest said gripper members in their spread-apart position, and to on the other hand provide for release of, and inward pivoting of, said gripper members 11. A central belt lock according to claim 10, in which said stud, remote from said base plate of said housing, is provided with an annular surface which surrounds said first axial bore, and which is provided with said guide members in the form of two radially extending and aligned raised portions for controlling the movements of said tiltable disk via said cam member; said raised portions have rounded slide surfaces for contacting said cam surfaces of said cam member, which is rigidly connected to said tiltable disk, and is disposed essentially in the plane of said locking member wings of said gripper members, and over said guide members.

12. A central belt lock according to claim 11, in which said raised portions on said annular surface of said stud are in the form of rollers.

13. A central belt lock according to claim 1, in which, means to release individual ones of said connection members including respective grip recesses are provided on said rotary member over the pertaining ones of said connection members.

14. A central belt lock for safety belts, especially such belts for pilots and other aviators or for parachute jumpers, for the rapid and at the same time releasable connection of several belts which are provided with connection members and which come together at a central point; the lock includes means for securely holding said connection members in place as well as for releasing the connection members, with said means being operatively coupled with a manually operable rotary member, which is disposed over a central stud in conjunction with which various movements in the lock occur; the improvement therewith which comprises:

said rotary member having disposed adjacent thereto a linearly displaceable device which is operated by finger pressure to move out of a starting position thereof;

arresting means operatively associated with and having an arresting position to prevent the accidental release of said means for securely holding said connection members in place;

at least one transfer element operatively associated with said linearly displaceable device and said arresting means for temporarily releasing the latter;

spring means for spring-loading said linearly displaceable device counter to the direction in which said displaceable device is pressed when operated; said linearly displaceable device, when returning to the starting position thereof under the effect of said spring means, moving said arresting means back to the arresting position thereof;

a housing having slot-like recesses, and also including a plurality of anchor bolts which are disposed axially of said slot-like recesses, are connected and held by a guide cross, are displaceable, against action of said spring means, at right angles to the base plate of said housing, and can be withdrawn from said slot-like recesses in at least that position of said rotary member which permits said connection members to be inserted into said lock; said stud is displaceable at right angles to said base plate of said housing, and acts upon said guide cross, in the vicinity of which said stud is provided with a securing member for controlling the movability of said guide cross, and hence of said anchor bolts, in the various functional positions of said lock; said rotary member is mounted to the top of said stud remote from said base plate of said housing, and is rotatable with said stud in tither direction, and can also be pressed into said housing with said stud; the further improvement therewith comprising:

a rotary pin which is rotatably and axially mounted in said stud, and forms said transfer element for transmitting the movements of said linearly displaceable device to said securing member, which forms said arresting means; and a coupling provided at that end of said rotary pin remote from said base plate of said housing for connecting said rotary pin with said linearly displaceable device to convert the longitudinal movements of said device into the rotary movements of said rotary pin; that end of said rotary pin closest to said base plate of said housing is provided with said securing member, and rotates relative to said guide cross and said anchor bolts.

15. A central belt lock according to claim 14, in which said coupling between said linearly displaceable device on the one hand, and said rotary pin on the other hand, is in the form of a toothed rack and pinion coupling, with a portion of said linearly displaceable device being in the form of a toothed rack, and with that end of said rotary pin remote from said base plate of said housing being provided with a pinion which meshes with said toothed rack; and in which said first spring is a return spring which effects said spring-loading of said linearly displaceable device counter to the direction in which it is pressed when operated.

16. A central belt lock according to claim 15, in which said linearly displaceable device is in the form of a flat, elongated rectangular piece which is longitudinally displaceably guided in a correspondingly sized, shallow, pocket-like rail; said rectangular piece is provided with an elongated slot, one long edge of which is embodied as said toothed rack, with said pinion being disposed in the open space of said elongated slot.

17. A central belt lock according to claim 16, in which said shallow, pocket-like guide rail for said linearly displaceable device is provided on that side of said rotary member remote from said base plate of said housing.

18. A central belt lock according to claim 17, in which the center of said guide cross is provided with a slot, and in which said securing member on said rotary pin is in the form of a T-shaped locking bar which passes through said slot of said guide cross, with said slot having a length corresponding to the span of said T-shaped securing member, so that when these two elements are aligned with one another, said guide cross with said anchor bolts can move past said securing member in the axial direction of said stud.

19. A central belt lock according to claim 18, in which said slot of said guide cross is provided with enough play relative to said T-shaped securing member to permit said guide cross to be tilted into an inclined position in said lock housing, with said inclined position being suitable for insertion of a belt connection member, and hence for depression of the associated anchor bolt.

* * * * *